(12) United States Patent
Bangalore et al.

(10) Patent No.: US 8,462,917 B2
(45) Date of Patent: *Jun. 11, 2013

(54) METHOD AND APPARATUS FOR AUTOMATICALLY BUILDING CONVERSATIONAL SYSTEMS

(75) Inventors: Srinivas Bangalore, Morristown, NJ (US); Mazin G. Rahim, Warren, NJ (US); Junlan Feng, North Plainfield, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/465,659

(22) Filed: May 7, 2012

(65) Prior Publication Data
US 2012/0221331 A1 Aug. 30, 2012

Related U.S. Application Data

(63) Continuation of application No. 12/644,393, filed on Dec. 22, 2009, now Pat. No. 8,175,230, which is a continuation of application No. 10/742,466, filed on Dec. 19, 2003, now Pat. No. 7,660,400.

(51) Int. Cl.
| | |
|---|---|
| *H04M 1/64* | (2006.01) |
| *H04M 3/493* | (2006.01) |
| *G06Q 10/06* | (2006.01) |
| *G06Q 30/02* | (2006.01) |
| *G06Q 30/06* | (2006.01) |
| *H04L 12/64* | (2006.01) |
| *H04M 7/00* | (2006.01) |

(52) U.S. Cl.
CPC ....... *H04M 3/4938* (2013.01); *G06Q 10/06311* (2013.01); *G06Q 30/0201* (2013.01); *G06Q 30/0635* (2013.01); *H04L 12/6418* (2013.01); *H04M 7/0009* (2013.01); *H04M 2201/40* (2013.01); *H04M 2201/60* (2013.01); *H04M 2203/355* (2013.01)

USPC .............. 379/88.17; 370/352; 379/88.01; 379/220.01; 701/117; 704/235; 704/251; 704/260; 704/265

(58) Field of Classification Search
CPC .......... G06Q 10/06311; G06Q 30/0201; G06Q 30/0635; G10L 15/26; H04M 1/64; H04M 3/4938; H04M 7/0009; H04M 2201/40; H04M 2201/60; H04M 2203/355; H04L 12/6418
USPC .............. 370/352; 379/88.01, 88.17, 220.01; 701/117; 704/235, 251, 260, 265
See application file for complete search history.

(56) References Cited

U.S. PATENT DOCUMENTS

| 5,913,193 A | 6/1999 | Huang et al. |
| 5,915,001 A | 6/1999 | Uppaluru |

(Continued)

FOREIGN PATENT DOCUMENTS

| EP | 0 878 948 A2 | 3/1998 |
| EP | 1 041 801 A2 | 3/2000 |
| WO | WO 01/29742 A2 | 4/2001 |

OTHER PUBLICATIONS

Chu et al., "Selecting Non-Uniform Units from a Very Large Corpus for Concatenative Speech Synthesizer," 2001 IEEE International Conference on Acoustics, Speech, and Signal Processing, vol. 2, May 2001, pp. 785-788.

(Continued)

*Primary Examiner* — Gerald Gauthier

(57) ABSTRACT

A system and method provides a natural language interface to world-wide web content. Either in advance or dynamically, webpage content is parsed using a parsing algorithm. A person using a telephone interface can provide speech information, which is converted to text and used to automatically fill in input fields on a webpage form. The form is then submitted to a database search and a response is generated. Information contained on the responsive webpage is extracted and converted to speech via a text-to-speech engine and communicated to the person.

20 Claims, 5 Drawing Sheets

U.S. PATENT DOCUMENTS

| | | | |
|---|---|---|---|
| 6,173,263 B1 | 1/2001 | Conkie | |
| 6,233,544 B1 | 5/2001 | Alshawi | |
| 6,266,637 B1 | 7/2001 | Donovan et al. | |
| 6,311,182 B1 | 10/2001 | Colbath et al. | |
| 6,345,250 B1 * | 2/2002 | Martin | 704/260 |
| 6,366,883 B1 | 4/2002 | Campbell et al. | |
| 6,401,094 B1 | 6/2002 | Stemp et al. | |
| 6,456,699 B1 | 9/2002 | Burg et al. | |
| 6,466,654 B1 | 10/2002 | Cooper et al. | |
| 6,505,158 B1 | 1/2003 | Conkie | |
| 6,539,080 B1 | 3/2003 | Bruce et al. | |
| 6,567,745 B2 | 5/2003 | Fuchs et al. | |
| 6,570,974 B1 | 5/2003 | Gerszberg et al. | |
| 6,587,786 B1 | 7/2003 | La Rue | |
| 6,587,822 B2 | 7/2003 | Brown et al. | |
| 6,604,075 B1 | 8/2003 | Brown et al. | |
| 6,604,090 B1 | 8/2003 | Tackett et al. | |
| 6,615,177 B1 | 9/2003 | Rapp et al. | |
| 6,624,803 B1 | 9/2003 | Vanderheiden et al. | |
| 6,633,846 B1 | 10/2003 | Bennett et al. | |
| 6,636,504 B1 | 10/2003 | Albers et al. | |
| 6,662,340 B2 | 12/2003 | Rawat et al. | |
| 6,807,529 B2 | 10/2004 | Johnson et al. | |
| 6,832,196 B2 | 12/2004 | Reich | |
| 6,859,776 B1 | 2/2005 | Cohen et al. | |
| 6,859,910 B2 | 2/2005 | Croy | |
| 6,895,084 B1 | 5/2005 | Saylor et al. | |
| 6,925,288 B2 | 8/2005 | McDonnell et al. | |
| 6,934,684 B2 * | 8/2005 | Alpdemir et al. | 704/265 |
| 6,944,592 B1 * | 9/2005 | Pickering | 704/251 |
| 6,983,307 B2 | 1/2006 | Mumick et al. | |
| 6,996,609 B2 | 2/2006 | Hickman et al. | |
| 7,038,807 B1 | 5/2006 | Karres | |
| 7,099,453 B2 * | 8/2006 | Crockett et al. | 379/220.01 |
| 7,143,042 B1 | 11/2006 | Sinai et al. | |
| 7,146,323 B2 | 12/2006 | Guenther et al. | |
| 7,177,862 B2 | 2/2007 | Zhang et al. | |
| 7,197,460 B1 | 3/2007 | Gupta et al. | |
| 7,200,677 B1 | 4/2007 | Allen et al. | |
| 7,222,074 B2 | 5/2007 | Zhou | |
| 7,275,086 B1 | 9/2007 | Bodnar | |
| 7,366,766 B2 | 4/2008 | Kroeker et al. | |
| 7,373,300 B1 | 5/2008 | Bangalore et al. | |
| 7,434,162 B2 | 10/2008 | Gorelov et al. | |
| 7,437,357 B2 | 10/2008 | Monberg et al. | |
| 7,487,440 B2 | 2/2009 | Gergic et al. | |
| 7,577,593 B2 | 8/2009 | Tarvydas et al. | |
| 7,580,842 B1 | 8/2009 | Bangalore et al. | |
| 7,609,829 B2 | 10/2009 | Wang et al. | |
| 7,660,400 B2 * | 2/2010 | Bangalore et al. | 379/88.17 |
| 7,869,998 B1 | 1/2011 | Di Fabbrizio et al. | |
| 8,060,369 B2 | 11/2011 | Bangalore et al. | |
| 8,065,151 B1 | 11/2011 | Bangalore et al. | |
| 8,090,583 B1 | 1/2012 | Bangalore et al. | |
| 8,175,230 B2 * | 5/2012 | Bangalore et al. | 379/88.17 |
| 2001/0056479 A1 | 12/2001 | Miyayama et al. | |
| 2002/0078140 A1 | 6/2002 | Kelly et al. | |
| 2002/0128821 A1 | 9/2002 | Ehsani et al. | |
| 2002/0164000 A1 | 11/2002 | Cohen et al. | |
| 2003/0012183 A1 * | 1/2003 | Butler et al. | 370/352 |
| 2003/0012344 A1 | 1/2003 | Agarwal et al. | |
| 2003/0078779 A1 | 4/2003 | Desai et al. | |
| 2003/0078987 A1 | 4/2003 | Serebrennikov | |
| 2003/0093428 A1 | 5/2003 | Suzumori et al. | |
| 2003/0200094 A1 | 10/2003 | Gupta et al. | |
| 2004/0128136 A1 | 7/2004 | Irani | |
| 2004/0205614 A1 | 10/2004 | Keswa | |
| 2005/0076089 A1 | 4/2005 | Fonseca | |
| 2005/0131625 A1 * | 6/2005 | Birger et al. | 701/117 |
| 2005/0135571 A1 * | 6/2005 | Bangalore et al. | 379/88.01 |
| 2005/0182770 A1 | 8/2005 | Rasmussen et al. | |
| 2007/0226198 A1 | 9/2007 | Kapur | |
| 2009/0292529 A1 | 11/2009 | Bangalore et al. | |
| 2010/0098224 A1 * | 4/2010 | Bangalore et al. | 379/88.17 |
| 2012/0221331 A1 * | 8/2012 | Bangalore et al. | 704/235 |

OTHER PUBLICATIONS

Lee et al., "A Very Low Bit Rte Speech Coder Based on a Recognition/Synthesis Paradigm," IEEE Transactions on Speech and Audio Processing, vol. 9, No. 5, Jul. 2001, pp. 482-491.

Veldhuis et al., "On the Computation of the Kullback-Leibler Measure of Spectral Distances," IEEE Transactions on Speech and Audio Processing, vol. 11, No. 1, Jan. 2003, pp. 100-103.

Y. Stylianou (1998) "Concatenative Speech Synthesis using a Harmonic plus Noise Model", Workshop on Speech Synthesis, Jenolan Caves, NSW, Australia, Nov. 1998.

VoiceObjects White Paper, Jul. 2003.

Smart Bots: Solutions for the Networked Economy, White Paper, 2001.

Case Study: Customer Service "Employees" Who Never Need a Break, Dec. 4, 2001.

Anonymous: <<AT&T breakthrough speech technology designed to increase sales land customer service productivity >>, AT&T News Release, 'Online!, Sep. 30, 2003, pp. 1-2—XP00232137.

Feng et al. "Webtalk: Mining websites for automatically building dialog systems" IEEE Automatic Speech Recognition and Understanding, Nov. 30-Dec. 3, 2003, pp. 168-173.

M. Beutnagel, M. Mohn and M. Riley, "Rapid Unit Selection from a Large Speech Corpus for Concatenative Speech Synthesis", In *Proc. EUROSPEECH*, pp. 607-610, Budapest, 1999.

Robert Endre Tarjan and Andrew Chi-Chih Yao, "Storing a Sparse Table", Communications of the ACM, vol. 22 Issue 11, pp. 606-611, Nov. 1979.

Anonymous: "AT&T VoiceTone, A new high-touch automation solution to delight customers and dramatically cut transaction costs", AT&T Knowledge Ventures, two pages, 2006.

* cited by examiner

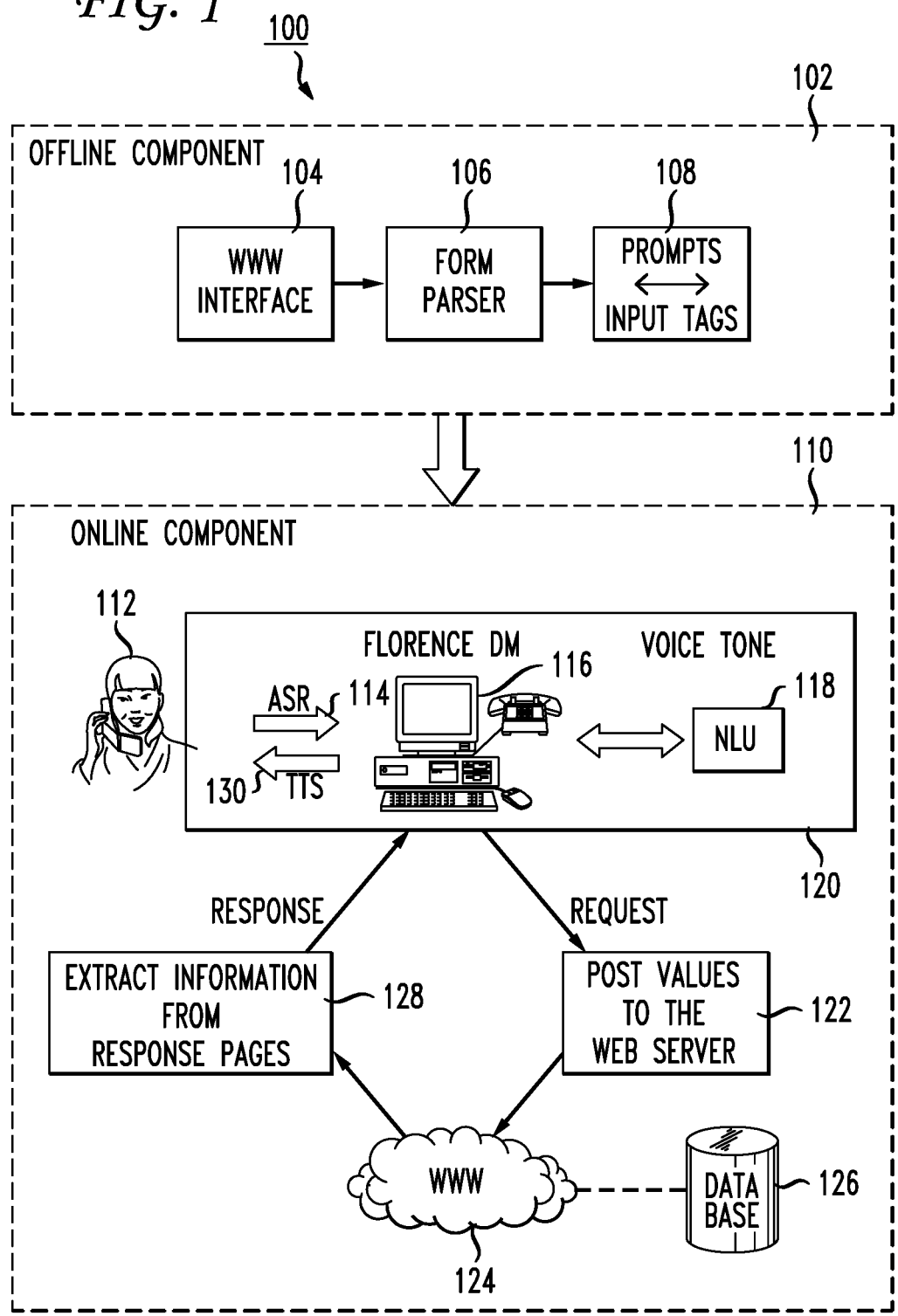

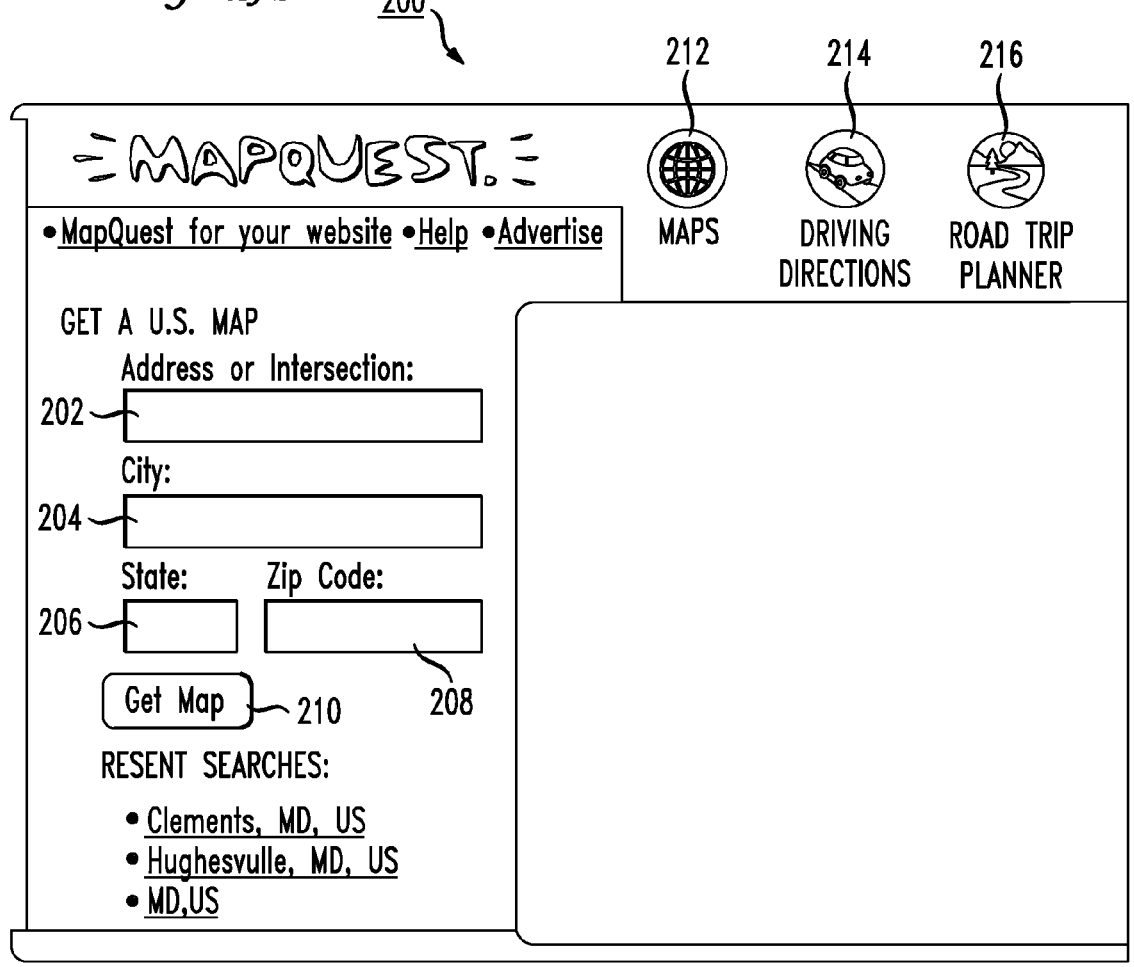

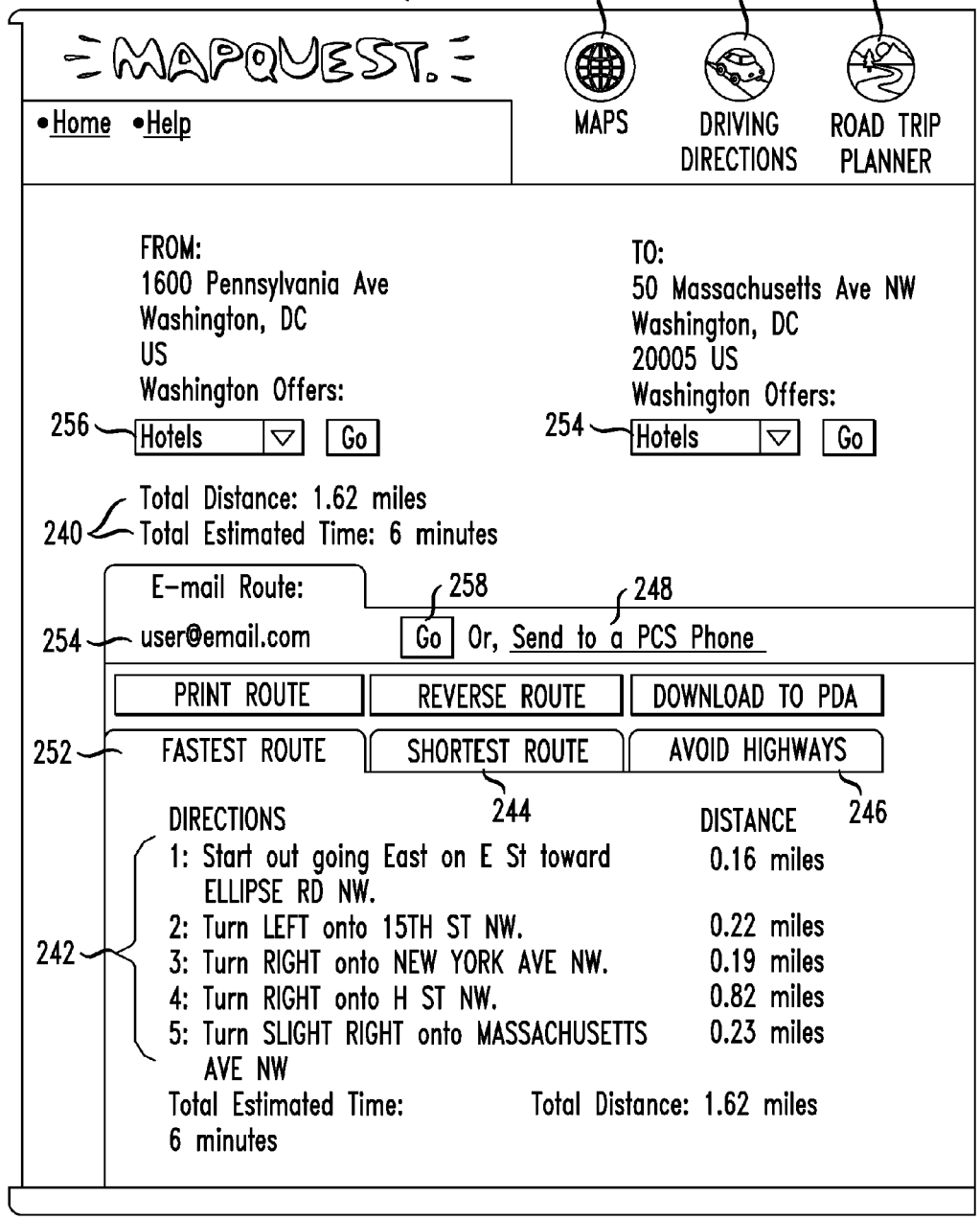

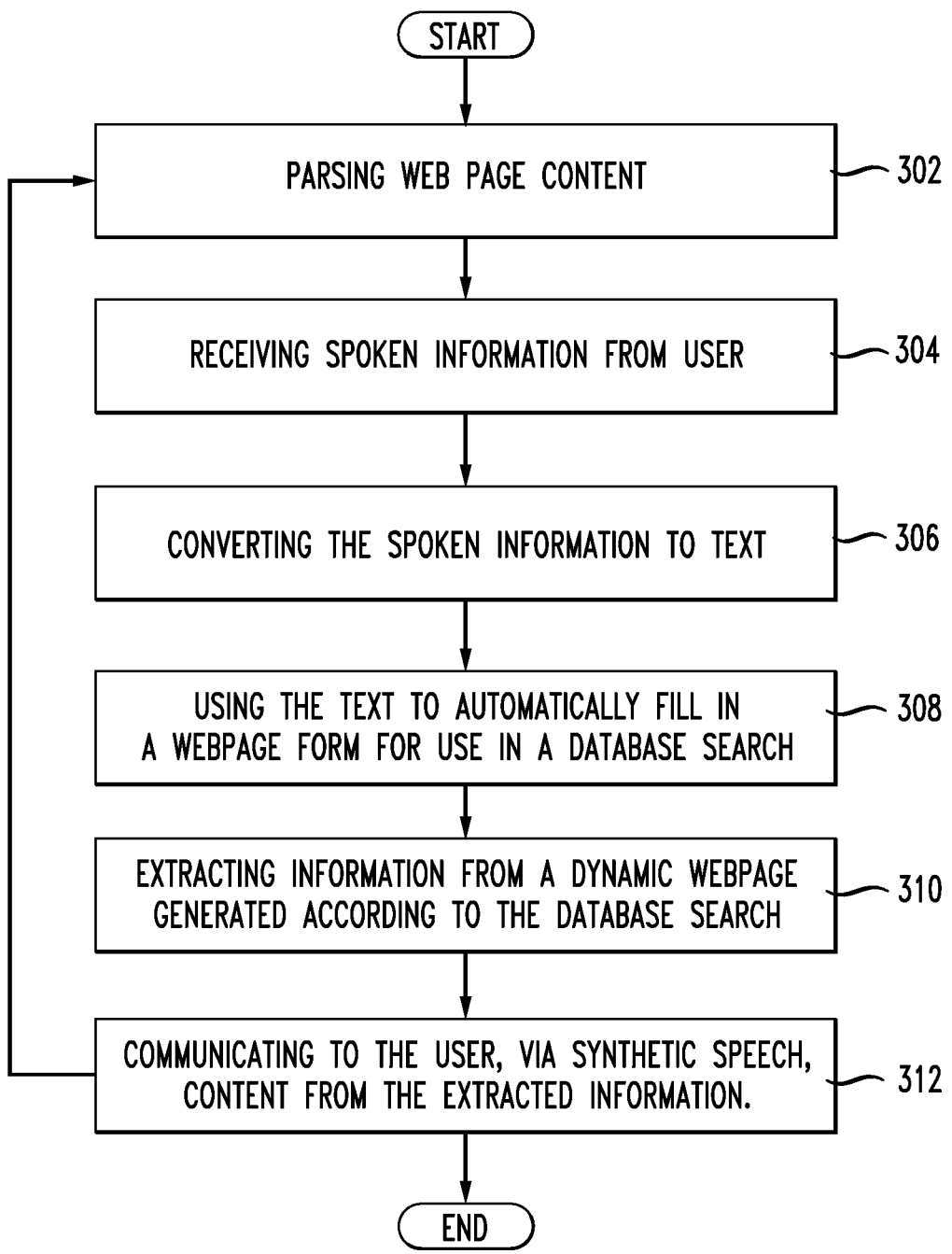

METHOD AND APPARATUS FOR AUTOMATICALLY BUILDING CONVERSATIONAL SYSTEMS

RELATED APPLICATIONS

The present application is a continuation of U.S. patent application Ser. No. 12/644,393, filed Dec. 22, 2009 now U.S. Pat. No. 8,175,230, which is a continuation of U.S. patent application Ser. No. 10/742,466, filed Dec. 19, 2003, now U.S. Pat. No. 7,660,400. The contents of which these applications are incorporated herein by reference in their entirety.

BACKGROUND OF THE INVENTION

1. Field of the Invention

The present invention relates to spoken dialog systems and more specifically to a system and method of dynamically building conversational systems for interfacing with databases.

2. Introduction

As the world-wide web (WWW) evolves, user interaction with the computer to provide and receive information continues to improve and become more efficient. Search engines allow users to provide a few keywords and receive listings of relevant webpages containing content. The size and number of databases available for searching continually increases, thus increasing the complexity of the process of getting desired content to users.

One way in which the WWW provides for a user to interface with a database or set of databases is through forms. Forms are used to provide a user a customized response based on the content of the database and the user's input. The WWW enables an unlimited number of ways to present and govern the user's interaction. Many are investing resources in electronic customer relationship management (e-CRM) to intelligently analyze and improve the user's experience.

However, with the ever increasing demand for e-CRM and e-care, the number of forms on the web has begun to increase dramatically. User-related information, such as name, address, zip code email address, credit card information, data related to personal interests and other types of information or various combinations of data are often required to learn about the user and engage in a dialog. In many scenarios, a user that desires information, such as flight reservations or location direction to an address or entity such as store or building, needs to input information into a form containing input fields in order to access the database containing the information and to receive a response.

In many cases, as an access client like Microsoft's Internet Explorer receives the form-filled information and transmits the information to a web-server, the responsive webpage is a dynamically generated webpage that incorporates the user's input information. In other words, the webpage that is delivered to the client is not a static webpage that contains previously generated content. Dynamically generated webpages often arise when web applications dynamically generates a page that contains information specific to the user's request. Therefore, a webpage delivered in response to a user's providing information in a form related to a travel reservation, or a personal account, etc., is delivered via a dynamically generated webpage. Dynamically-generated webpages are difficult to deal with since they not indexed by search engines and are generated on the fly.

With the increase in the trend of e-CRM and web-enabled access to databases, especially proprietary databases, there is an increasing number of webpages with form interfaces that return dynamically generated pages. Accompanying this increase in e-CRM is a focus on voice-enabled interfaces for various services. One area where voice-enabled services are utilized is in customer services for companies. For example, AT&T's VoiceTone$^{SM}$ service provides a natural, conversational speech interface that listens and responds like a live agent. Callers can simply make a request, ask a question, or even utter a few words and thus avoid time-consuming menus, structured speech and touch-tone prompts. AT&T VoiceTone$^{SM}$'s intelligent intent determination can quickly and accurately understand what callers are trying to accomplish and respond to their precise needs.

One method of interacting via voice with the WWW is via VoiceXML (or VXML). This programming language enables a webpage to be programmed with various voice interactions with a user. There are deficiencies in using VoiceXML, however. The dialog is scripted and must follow the programmed flow. Questions or issues that a user may have outside of the program flow will not be addressed. Further, if a website is updated with new or different information, the VoiceXML code needs to be reprogrammed to accommodate such changes.

There is a need in the art for a system and method that utilizes the benefits and efficiency of voice-enabled interaction to improve a user's interaction with the Internet and various types of databases. There is also a lack of ability to interact with the Internet in the process of filling out a form using a voice-enabled service.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

One embodiment of the invention comprises a method of providing information to a user utilizing a natural language dialog. The method comprises receiving spoken information from a user, converting the received spoken information to text, automatically filling in a web-based form using the text converted from speech, receiving a dynamically-generated webpage generated according to the filled webpage form and communicating to the user, via synthetic speech, content from the dynamically-generated webpage.

An exemplary type of information that may be provided relates to location. For example, the user may be engaging in a natural voice dialog with a computer service such as AT&T's VoiceTone$^{SM}$, and the conversation comes to a point where the user desires location information. In this case, the invention can provide means for receiving information from the user and then using a form-based webpage to obtain location-based information. This information is then processed and presented to the user via synthetic speech in the natural language conversation. However, as can be appreciated, the location example is merely an exemplary method that illustrates the basic principle of the invention. The invention is not limited to any specific type of information that is provided to a user via the dialog.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1 illustrates the architecture of the present invention; and

FIG. 2A shows a webpage with input fields for receiving an address;

FIG. 2C shows a webpage response to a request for directions from a location to a destination; and FIG. 3 illustrates a method according to an aspect of the present invention.

DETAILED DESCRIPTION OF THE INVENTION

Figure 2B:
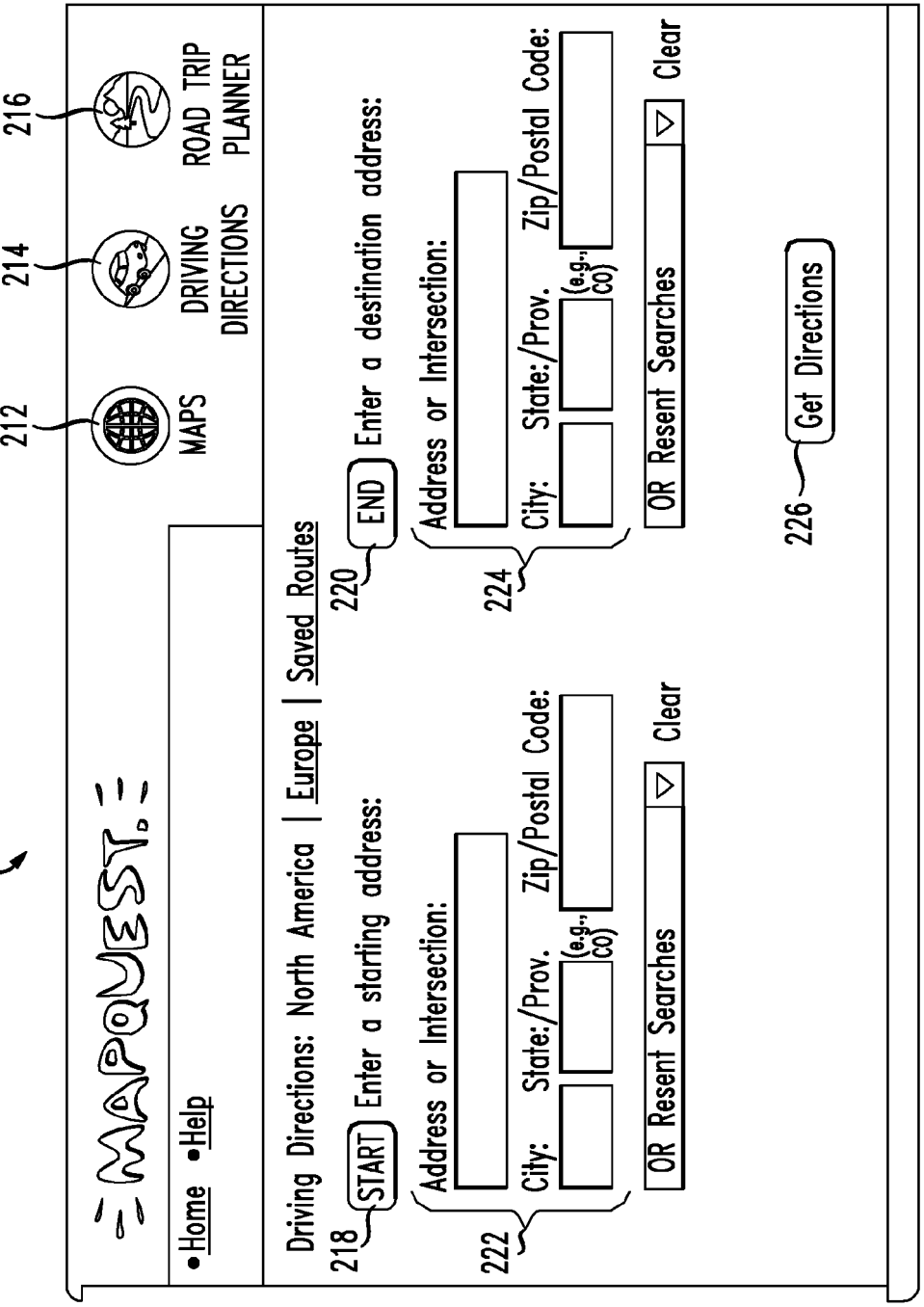
FIG. 2B shows a webpage with input fields for a starting address and a destination address.

The present invention provides a solution to enable interaction between a telephone or other voice communication device with the world wide web. The communication is between a live user and a computer system having the necessary technology to perform automatic speech recognition, perform dialog management, and generate synthetic responses to the user. Such systems can approach a realistic conversation as though it was between two people. One example of such a system is AT&T's VoiceTone$^{SM}$ service. The basic components of these voice-enabled services are generally known and therefore the technical details will not be provided here other than introductory information.

The VoiceTone$^{SM}$ service provides an improved way to communicate with people using a voice-based contact or audible dialog with a virtual agent. Such voice-based interactions with customers of a business, for example, can improve the customer relationship with that business in that the experience is much more enjoyable then pressing numbers on a telephone to navigate through a menu system. In the menu systems, users must "press 1 for sales" or "press 2 for technical assistance" and so on. The VoiceTone$^{SM}$ system enables a virtual agent to ask the user "How may I help you?". Using automatic speech recognition and dialog management, the VoiceTone$^{SM}$ system can understand and provide the desired information or assistance to the user.

FIG. 1 illustrates an off-line component 102 of the architecture 100 that shows a WWW interface 104, a form parser 106, and a box showing the steps of providing prompts and input tags 108 for managing the interaction between the VoiceTone$^{SM}$ service and the WWW. The form parser 106 will analyze a webpage to learn what input fields are available and what information is to be inserted into each field. For example, if an input field exists for a person's address, the field will have accompanying text that may state: "Address" or "Street" and another field may have associated text that states "Zip Code" and so on. The form parser will retrieve and organize for a webpage all of the input fields and labels. This information is used to generate the appropriate prompts and input tags 108 for use in the dialog process 120.

The dynamically generated prompts and input tags for a webpage having input fields for an address, phone number and email address will relate to modifying the dialog with the user 112 to insure that the prompts to the user (such as "Please give me your address and phone number" and "Please give me your email address") will be provided and the response from the user will be identified and tagged. Named entity approaches for identifying information such as an address in speech or a phone number are known. Any approach may be used to identify the information within a user response that should be associated with the various input fields on a webpage.

The analysis of the webpage performed by the form parser allows for further analysis of the webpage. Many forms include required information and non-required information. An example is that to complete a form the webpage may require the user to input his name, address, phone number and an email address. These fields on the webpage are often marked with an asterisk "*" or other means such as color. The form parser 106 can identify the necessary fields by analysis of the text or colors of the webpage or other means to identify the necessary input fields. For example, if the user gives a name, address, phone number, but no email address, the dialog manager may prompt the user as follows: "Thank you for that information, we also need your email address to provide you with your directions. What is your email address?".

FIG. 1 further illustrates the basic components of the VoiceTone$^{SM}$ system 120 in the broader context of the architecture 100 of the invention. A user 112 receives synthetic (text-to-speech or TTS) or recorded speech from the system 130 and can provide a response. An example would be the system asking "How may I help you?". The user may respond "I need directions to Union Station from the White House". The speech from the user is recognized using an automatic speech recognition system 114. A dialog manager 116 such as the known Florence Dialog Manager may be used to manage the interaction and responses to the user. As part of the management of these responses, a natural language understanding module 118 is used to understand the meaning of the received speech from the user 112.

An advantage over VXML of this dialog interchange and ability to fill in form information via the dialog includes the ability to receive a phrase of information and fill in the various input field of a form without requiring individual questions for each field. For example, using the off-line and dynamic parsing ability of this invention, the dialog could accept a statement from the user such as "I want to fly from boston to washington on Jan. 5, 2004 before noon." The present invention enables the system to complete all of the necessary input fields and then continue to request information only for other required field, if necessary.

Many companies or entities have websites where users can provide information or interact with the site. For example, a well-known site Mapquest®, having an example webpage 200 shown in FIG. 2A, includes input fields for an address 202, city 204, state 206, zip code 208 and a "get map" button 210 to execute the search. The user inputs as much information as the user knows. A database search is performed and a map of the address is presented to the user that can be manipulated and viewed or printed. If a user were to call a virtual agent associated with Mapquest®, the user may not be in a position to have a PDA or computer screen to enable the person to interact with this form-filling webpage to obtain information. One aspect of the present invention enables a user to interact with and receive information from a webpage that requires form-filling information.

FIG. 1 illustrates this interaction between VoiceTone$^{SM}$ or the like and a website. If, in a dialog with the user, the user states that he would like to know where Union Station is from the White House, the VoiceTone$^{SM}$ service will generate a request that can be utilized for posting values to the Mapquest® webserver 122. The request may be the result of further dialog with the user to gather more information. For example, the dialog may ask the user "Are you in Washington DC?" or "Do you want to take the Metro or will you travel by car?" For the purpose of this example, assume that the user will drive from the White House to Union Station. In this case, the information in the request that will be used to interact with Mapquest® will include the necessary information to populate the necessary input fields to obtain the information.

On Mapquest®, to get driving directions, a user would click on the driving directions button 214. Other buttons include a maps button 212 and a road trip planner 216. FIG. 2B illustrates the forms to fill out for driving directions. On this webpage 230, there is a starting address 218 and a destination address 220. The information is filled into field 222 for a starting address and the field 224 for a destination address. The present invention involves generating the necessary information drawn from the VoiceTone$^{SM}$ dialog to submit a request from the VoiceTone$^{SM}$ application to populate the necessary fields, for example in Mapquest, to obtain information. The interaction with the webpage 230 is all performed by VoiceTone$^{SM}$ or a process associated with VoiceTone$^{SM}$ inasmuch as the user is on a telephone call.

Returning to FIG. 1, once the values or information is posted to a webserver 122, the information via the WWW 124 is retrieved from a database 126. FIG. 2C illustrates a response from Mapquest® to the search request for directions from the White House to Union Station. This page 250 shows information such as the total distance and estimated time 240, directions (in steps 1-5) 242, and other options tabs such as shortest route 244, a route that avoids highways 246, an option to receive directions by email 246 and an option to send to a phone 248. Of course, since this interchange is just an example, other options will be presented to a user in a response depending on the website and user request. This is only an illustration of one way to receive information from a request submitted via the WWW using input fields.

FIG. 1 then illustrates a step of extracting information from the response webpages 128 and submitting that extracted information to VoiceTone$^{SM}$ 120. In this example, information such as "total distance: 1.62 miles" and "total estimated time: 6 minutes" as well as the 5 step directions are extracted from the webpage and provided in the responsive package of information to VoiceTone$^{SM}$. From this extracted information, VoiceTone$^{SM}$ generates a text-to-speech 130 response to the user 112. The response may be, for example, "here are your directions. The total distance from the White House to Union Square by driving is 1.62 miles. It should take 6 minutes to arrive. Start out going east on E street northwest toward Ellipse road northwest for 0.16 miles. Turn left onto fifteenth street northwest and go 0.22 miles. Turn right onto new your avenue north west and go 0.19 miles. Turn right onto H street northwest and go 0.82 miles. Turn slightly right onto Massachusetts avenue northwest and go 0.23 miles." In this manner, the extracted information is converted into conversational text and then synthetically generated and delivered to the user.

In another aspect of the invention, other information on the webpage is extracted and incorporated into the dialog. For example, VoiceTone$^{SM}$ may ask the user "would you like the fastest route, the shortest route or to avoid highways?" This would be in response to the tabbed options in FIG. 2C 252, 244 and 246. Further, the VoiceTone$^{SM}$ application may ask "do you wish these directions emailed to you or sent to a PCS phone?" See options 246 and 248 of FIG. 2C. In this regard, if the response is "yes" from the user, a dialog is generated from VoiceTone$^{SM}$ that retrieves the necessary email address or phone number to continue to interact with the Website via the voice conversation and fill in further input fields such as the email address input field 254. Further extraction from webpages and modification of the dialog continues.

Therefore, the invention comprises a system and method of providing the interface between a voice-enabled virtual agent and existing websites that receive information requests via input fields and provide information. The website may be restructured or designed such that the information that they provide is easier to extract for the purpose of the voice-interaction with website. This restructuring or design could focus on providing more description of input fields. For example, instead of "to:" to identify an address input field for a destination, the website would label the field "destination address." In this manner, the form parser 106 will more accurately and efficiently identify webpage content and input fields as it performs its process.

There are an unlimited number of kinds of websites to which the present invention may apply: airlines reservations, retail stores, auctions, and so on. In another example, often users desire to find the nearest store to their location. Using a phone, the user can engage in a natural language dialog with an application such as VoiceTone$^{SM}$ and provide the store name and zip code. In this regard, this aspect of the invention may differ from the form-filling application. With a store name and zip code, the process according to the present invention may be able to search the WWW and extract a store address from a store home webpage and present via TTS the response to the user.

The present invention enables voice interaction with dynamically-generated webpages. For example, the webpages discussed above that include content specific to the user request are generated on-the-fly to provide the necessary information for that specific user. An aspect of the present invention enables dynamic extraction of that information, and use of the extracted information within a voice-dialog.

Another example of a voice dialog according to an aspect of the present invention is as follows. This relates to the invention in use with a customer relations department of a company where the user is trying to return a product:

Computer: Thank you for calling, this is Julie, I am an automated attendant.

How can I help you?

User: I ordered a pair of shoes two weeks ago, I need to return them.

Computer: OK. I can help you process your return in one of two ways. You can return the merchandize to the customer service desk at the nearest retail store or you can mail the items back to the distribution center that shipped it to you. The address for the distribution center is on the back of the invoice. Would you like me to find the address of the closest store or distribution center?

User: Yes

Computer: May I have your home zip code?

User: 53018

Computer: Was that 53018?

User: Yes

Computer: Which shall I look up, a distribution center or a store?

User: I'd like the closest store

Computer: I can get that information for you. The closest store to you is at the Brookfield Square Mall, located on the corner of Brookfield Road and Marland Road in Brookfield. Would you like the phone number for that store?

User: No I can get it

Computer: Is there anything else I can do for you today?

User: No

Computer: Very well, have a nice day.

The above exchange between a user and a VoiceTone<sup>SM</sup> service or the like involves receiving the user's zip code, utilizing that information to obtain the location of the nearest store to that zip code from a webserver, extracting the address for the store from the received information from the webserver, and incorporating that information into the spoken dialog in the TTS response to the user. The response may also provide the nearest two, three or more locations to the user. The above example illustrates the customer relations management benefits of the present invention. Preferably, this invention is applicable to the context of a standard webpage that is not written using VoiceXML.

In a standard interaction with a webpage, if the user fills in only a portion of the necessary information, a dynamic webpage is presented to the user, often identifying the input field via color or some other means to highlight what further information is needed. An aspect of the present invention comprises providing the input information received from the user into the form. When the response from the webpage indicates that further information in another input field is needed, that field is identified and a prompt is generated to retrieve from the user the remaining information to complete the form. In this regard, part of the form parsing 106 may occur off-line prior to a dialog with the user, and part of the parsing may occur dynamically while the user is interacting via a spoken dialog with the service.

FIG. 2A illustrates a webpage 200 from Mapquest®. This page shows input fields for an address 202, city 204 and state 206, as well as a zip code 208 and a get map button 210. Other links include a link to maps 212, driving directions 214 and a road trip planner 216. FIG. 2B illustrates the webpage presented if the user selects the driving directions 214 button in FIG. 2A. In this webpage, the user is presented with input fields for an address, city, state and zip code 222, as well as address, city, state and zip code fields 224 for the destination address. Other buttons may be a start button 218, end button 220 and a get directions 226 button. These facilitate use of the website.

FIG. 2C illustrates the response from the website when a user inputs a starting address 1600 Pennsylvania Avenue (the White House) to 50 Massachusetts Ave (Union Station, Washington D.C.). Information includes the total distance 1.62 miles, and total estimates time: 6 minutes. Detailed directions are provided 242 to the user and several options enable the user to receive the fastest route 252, the shortest route 244 or a route that avoids highways 246. The user can receive the directions via email 254 or the directions can be sent to a PCS phone 248.

The form parser will analyze either off-line or dynamically each of the webpages illustrates in 2A, 2B and 2C to generate the appropriate prompts and input tags to receive via a voice dialog the information. As an example, after receiving via the voice dialog the "from" and "to" addresses, the service will receive the directions webpage shown in FIG. 2C. The form parser 106 will then identify the various pieces of information on the webpage 250 and dynamically adjust the dialog to ask the user questions such as: "Would you like to receive the directions via email or by phone?" If the response is by email, then the service receives the email address from the user or from another database or storage location and completes the process. The service may provide the directions (steps 1-5 on the webpage 250) via the voice dialog.

The form parser may also utilize prior history from the voice dialog. For example, assume the user originally stated "I need directions from the White House to Union Station and then I need a hotel". In this regard, the form parser 106 can utilize information contained in previous interactions with the user to intelligently parse the webpage information to determine what to incorporate into the dialog and what not to incorporate into the dialog. Then, when the webpage shown in FIG. 2C is presented, with hotel information in buttons 256 and 254, the dialog can be modified to present the user with the further information related to hotels on the webpage 250. In this manner, the service can intelligently interact with the user via the spoken dialog because the information that can be parsed from a webpage can be selectively presented to the user in the dialog.

FIG. 3 illustrates a method of interacting with web data via a natural language service. The method comprises parsing webpage content 302. This parsing can occur off-line or dynamically or a combination of off-line and dynamically during a spoken dialog. Off-line parsing occurs in advance of the spoken dialog wherein the web parse analyzes the website structure of a website to prepare the prompts and input tags that are available for use in the spoken dialog. The method then comprises receiving spoken information from a user (304). The information in this context is information that (1) may be parsed and inserted into an input field on a webpage; or (2) information used to search the WWW to find information for generating a response to the user. Next, the method comprises converting the spoken information to text (306) using known automatic speech recognition means and using the text to automatically fill a webpage form for use in a database search (308). Several examples of this step are discussed above. Another way of characterizing step (308) includes using the text to perform a more generalized web-search to locate information. Next, the method comprises extracting information from a dynamic webpage generated according to the database search (310) and communicating to the user, via synthetic speech, content from the extracted information (312). Other steps may be inserted including additional loops involving further dialog with the user to obtain further information for insertion in input fields to generate yet further dynamic webpages from which information is extracted for spoken presentation to the user.

In one aspect of the invention, the process returns to step (302) if another webpage is dynamically presented to the user for further parsing. Inasmuch as the user dialog and interaction with the WWW is dynamic, not all of these steps need to be performed for each interaction with the user.

One of the benefits of the present invention is that it can provide for a more open interaction with the user. Using VoiceXML, the user typically is asked a question each time for information related to an input field: "Please give me your street number"; "Please give me the city"; "Please give me your zip code" and so on. The present invention enables the user to provide a single utterance from which all the information is extracted for use in the website. Then, named entity extraction or some other means is used to identify the entities to extract from the speech. For example, the destination city, time of departure, originating city, etc.

In another aspect of the invention, the parser 106 may be modified to parse a website for more information than just input field content. Many websites may include text that identifies their address, their phone number, and email or other contact information. In this regard, if the user provides the following request "I need the nearest WalMart to my zip code, which is 12345." The parser 106 may traverse the Walmart website to extract information such as headquarters address, and local store addresses and zip codes. All the extracted information from the website can be parsed and identified to enable the user to get information. A series of company webpages may be off-line parsed to identify company store location addresses and zip codes. This extracted information can be stored in a database 126. From the database information, the response to the user's request can be identified and presented to the user. In this way, the user can receive the answer to his question: the closest Walmart to the zip code 12345 via the spoken dialog. Thus, the information used to generate a response to a user inquiry can come from extracting information from webpage content off-line or extracting information in dynamically generated webpages after a form filling step.

As can be appreciated, while the above examples are location-based, any kind of interaction or any type of information that is sought may be utilized. Other examples include bank account access, on-line shopping, auctions, on-line travel reservations, etc. The principles of the present invention can apply to any type of WWW interaction and to any combination of interactions. For example, if an off-line parsing of a company website produces a company store address and zip code that is provided to a user in a zip code comparison search, the user at that point may desire directions. At this stage in the interaction, the service can then utilize a website such as Mapquest® to use current information (store address as the destination address) and retrieve other information (the user's address within the previously provided zip code area) via the spoken dialog to move from the stage of providing the information of the nearest store to the stage of providing directions to the store from the user's current location.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, the "service" described above may comprise a variety of structures or combination of structures or servers that perform the processes described to engage the user in an intelligent conversation utilizing web content. It is immaterial to the present invention regarding the location on a network where software modules may be processed. Accordingly, the appended claims and their legal equivalents should only define the invention, rather than any specific examples given.

We claim:

1. A method comprising:
   prompting a user, via a prompt, to provide information associated with a field on a form;
   receiving speech from the user in response to the prompt;
   converting, via a processor, the speech to a text;
   filling in the field of the form with the text, to yield a filled form; and
   receiving a webpage generated based at least in part on the filled form.

2. The method of claim 1, wherein the field comprises a plurality of fields.

3. The method of claim 2, wherein the plurality of fields comprises a first field of the form and a second field of the form; and
   wherein filling in the field of the form with the text further comprises:
      placing a first portion of the text into the first field of the form; and
      placing a second portion of the text into the second field of the form.

4. The method of claim 1, wherein the speech relates to an entity name and location identifier.

5. The method of claim 1, wherein prompting the user and receiving the speech occur within a spoken dialog.

6. The method of claim 1, further comprising analyzing a website structure associated with the form, where the prompt is associated with the website structure.

7. The method of claim 6, wherein analyzing the website structure occurs off-line.

8. A system comprising:
   a processor; and
   a non-transitory computer-readable storage medium storing instructions which, when executed on the processor, perform a method comprising:
      prompting a user, via a prompt, to provide information associated with a field on a form;
      receiving speech from the user in response to the prompt;
      converting the speech to a text;
      filling in the field of the form with the text, to yield a filled form; and
      receiving a webpage generated based at least in part on the filled form.

9. The system of claim 8, wherein the field comprises a plurality of fields.

10. The system of claim 8, wherein the plurality of fields comprises a first field of the form and a second field of the form; and
    wherein filling in the field of the form with the text further comprises:
        placing a first portion of the text into the first field of the form; and
        placing a second portion of the text into the second field of the form.

11. The system of claim 8, wherein the speech relates to an entity name and location identifier.

12. The system of claim 8, wherein prompting the user and receiving the speech occur within a spoken dialog.

13. The system of claim 8, the non-transitory computer-readable storage medium storing additional instructions which perform a method comprising analyzing a website structure associated with the form, where the prompt is associated with the website structure.

14. The system of claim 13, wherein analyzing the website structure occurs off-line.

15. A non-transitory computer-readable storage medium storing instructions which, when executed on a computing device, cause the computing device to perform a method comprising:
    prompting a user, via a prompt, to provide information associated with a field on a form;
    receiving speech from the user in response to the prompt;
    converting the speech to a text;
    filling in the field of the form with the text, to yield a filled form; and
    receiving a webpage generated based at least in part on the filled form.

16. The non-transitory computer-readable storage medium of claim 15, wherein the field comprises a plurality of fields.

17. The non-transitory computer-readable storage medium of claim 15, wherein the plurality of fields comprises a first field of the form and a second field of the form; and
    wherein filling in the field of the form with the text further comprises:
        placing a first portion of the text into the first field of the form; and
        placing a second portion of the text into the second field of the form.

18. The non-transitory computer-readable storage medium of claim 15, wherein the speech relates to an entity name and location identifier.

19. The non-transitory computer-readable storage medium of claim 15, wherein prompting the user and receiving the speech occur within a spoken dialog.

20. The non-transitory computer-readable storage medium of claim 15, the non-transitory computer-readable storage medium storing additional instructions which perform a method comprising analyzing a website structure associated with the form, where the prompt is associated with the website structure.

* * * * *